Figure 1:
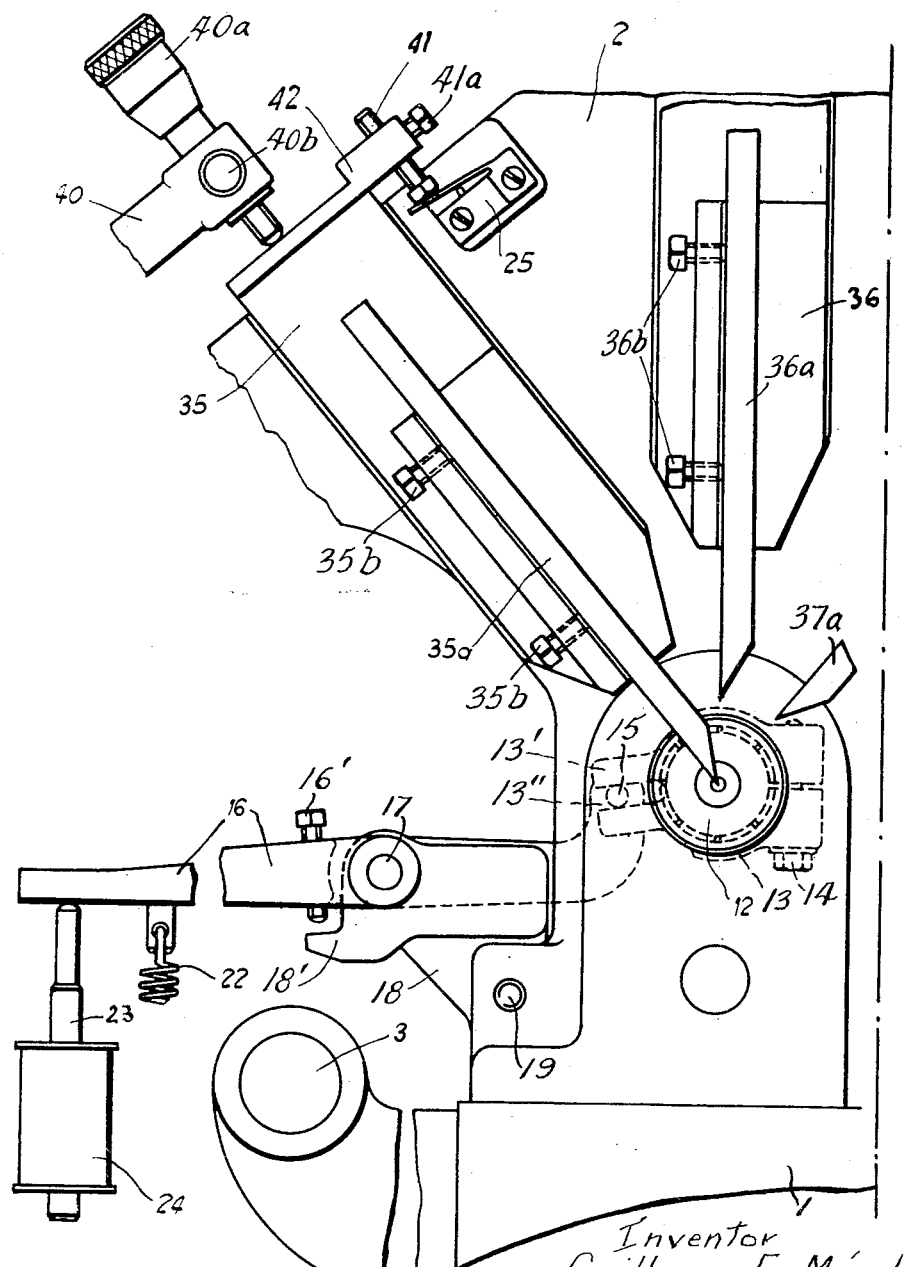

Oct. 26, 1965  GUILLAUME-ERNEST MÉGEL  3,213,721
CONTROL DEVICE FOR A STOCK GUIDING COLLET IN AN AUTOMATIC LATHE
Filed April 4, 1963  2 Sheets-Sheet 1

Inventor
Guillaume E. Mégel
By Wenderoth, Lind & Ponack
Attorneys

United States Patent Office 3,213,721
Patented Oct. 26, 1965

3,213,721
CONTROL DEVICE FOR A STOCK GUIDING COLLET IN AN AUTOMATIC LATHE
Guillaume-Ernest Mégel, Moutier, Switzerland, assignor to Usines Tornos Fabrique de Machines Moutier S.A., Moutier, Switzerland
Filed Apr. 4, 1963, Ser. No. 270,703
Claims priority, application Switzerland, Apr. 5, 1962, 4,155/62
4 Claims. (Cl. 82—2)

The U. S. Patent No. 3,115,800 filed April 11, 1960 describes a guiding device for guiding bar stock which is machined on an automatic lathe having a movable headstock, by means of tools fixed on tool holders controlled by cams fixed on the cam shaft of the said lathe. The said guiding device is secured by a nut in the support for tools in fan formation and comprises a conical sleeve in which is arranged a collet with a frusto-conical head provided with an auxiliary rear nut serving to secure a sleeve in which is mounted a slidable hollow member, the front end of which is made in the form of a guide collet, which is capable of being opened and closed, while maintaining a controlled guiding clearance for all time on the bar stock, with each cycle of operations of the tool holders, by a longitudinal movement of the hollow member towards the front and towards the rear.

In that arrangement, the reciprocatory movement of the hollow member is effected by means of a rotatable operator connecting the rear ends of this hollow member and the sleeve serving for the mounting thereof, the said operator being capable of being controlled from a cam fixed on the cam shaft and the action of which is applied against a return spring to a rocker, the oscillatory movement of which is transmitted to the said rotary operator with each cycle of operations of the lathe corresponding to one revolution of the cam shaft.

The present invention relates to a control device for a stock guiding collet of the aforementioned type, in which the operator connecting the rear ends of the hollow member and the sleeve serving for the mounting thereof is controlled from a lathe member which is connected to one of the tools so as to move therewith under the action of the same control means. In a preferred embodiment of the invention, this lathe member is constituted by the holder of the severing tool, because the severing tool is actuated at the end of a cycle of operations, i.e. precisely when the stock guiding collet must be opened. This operation is performed by an actuating element which is controlled electromagnetically, pneumatically or hydraulically or under combined control, from an initiating member that is itself actuated by the tool holder, said actuating element being in turn associated with a rocker, the oscillator movement of which is transmitted to the said rotary operator of the stock guiding collet.

The accompanying drawing illustrates one embodiment of the control device according to the invention by way of example.

Figure 2:
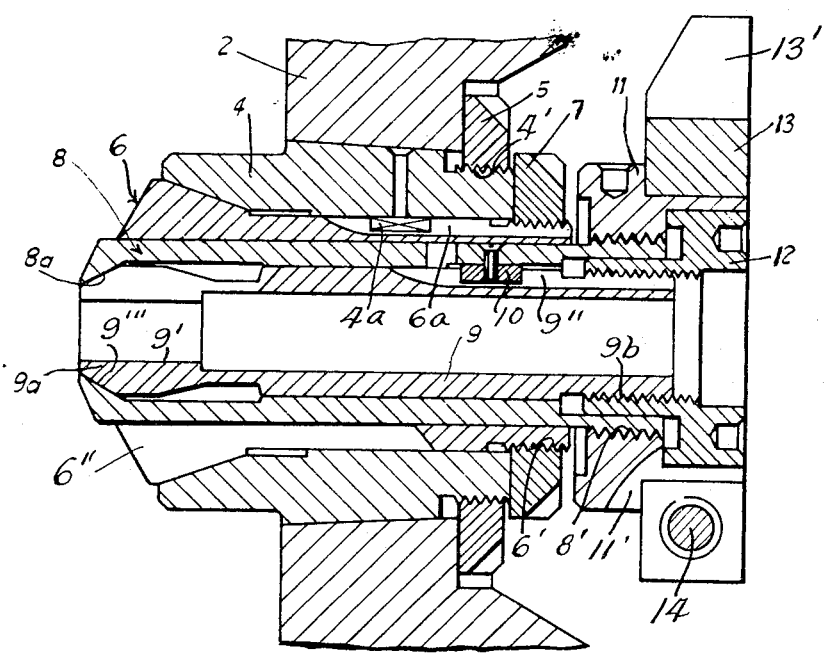

In the drawing:

FIG. 1 is a side elevation of the complete control device applied to an automatic lathe with a shifting headstock, of which only the parts having direct reference to the invention are shown, and FIG. 2 is an axial section of the stock guiding means which serve for guiding and centering the bar stock.

In view of the similarity existing from a constructional point of view between the arrangement according to FIGS. 1 and 2 and the example shown in the above stated U.S. Patent, the same reference numerals are used for various constructional elements in the accompanying drawings as in the drawing of that U.S. Patent.

In FIG. 1 the bed of an automatic lathe having a shifting headstock is marked 1 and a support 2 is fixed to this bed. Slides 35, 36 on which tools 35a, 36a, 37a are fixed by screws 35b, 36b are slidably mounted in fan disposition on support 2. The tools 35a, 36a, 37a, which serve for machining the bar which is rotated by means of a collet chuck rotatably journalled in the shifting headstock and driven by suitable means. Since the collet chuck and the shifting headstock, in which it is journalled, are in themselves not part of the invention, they are not shown in the drawing in order to avoid unnecessary complication.

As mentioned above the movement of the tool holders 35, 36 and the forward movement of the bar stock during the machining periods is effected by cams fixed on a cam shaft 3 (FIG. 1). As has already been mentioned, to ensure high precision of machining of the forward end of the bar, the automatic lathe is provided according to the invention with a device for guiding and centering the bar and this device will now be described.

A conical sleeve 4 (FIG. 2) is engaged in a conical bore in the support 2 and has a threaded cylindrical rear portion 4' upon which is threaded a nut 5 bearing against the rear face of the support 2 to secure the conical sleeve 4 firmly in the latter. This sleeve serves as a housing for an auxiliary collet 6 having radial slots 6" extending back from its forward end by which means elastically mounted jaws are formed. The front end of the collet 6 is conical and engages in the forward part of the sleeve 4 which has a corresponding socket. The rear portion 6' of the collet 6 is also threaded and carries a nut 7 which enables this collet to be tightened by drawing it backwards thereby to grip within it a sleeve 8 for which it serves as a seating. This arrangement enables the precise longitudinal position of the sleeve 8 to be adjusted. A longitudinal groove 6a provided in collet 6 and a key 4a secured to sleeve 4 and entering groove 6a prevent collet 6 from rotating within sleeve 4.

The sleeve 8 comprises a front portion provided with conical internal abutment surface 8a, and a threaded part 8' at the rear. In this sleeve 8 is lodged a slidable hollow member 9 having a front part 9a which forms a guide collet 9' to guide the stock bar (not shown) passing through the hollow member. The front part 9a of member 9 is slotted axially so as to be resilient. The front part 9a is provided with a conical external bearing surface 9''' corresponding to the stop surface 8a of the sleeve 8. Thus, the member 9, is brought to its closed position when it is pushed into the sleeve 8 from the rear end thereof. If it is desired, the member 9 can be made in two parts, of which one part, which would form the resilient head 9a, would be screwed on to the rear part, which would then be in the form of a socket. This latter construction of the hollow member 9 has the advantage of permitting only the resilient head and not the entire member 9 to be replaced when changing the diameter of the bar to be machined.

To prevent the hollow member 9 from rotating in relation to the sleeve 8 it has a longitudinal groove 9" in which engages a key 10 fixed to the inside of the sleeve 8. The rear part 9b of the hollow member 9 is threaded and the pitch of this thread is less than i.e. different from that on the rear part 8' of the sleeve 8.

On the threaded part 8' of the sleeve 8 is threaded a hollow member having a threaded part 11 while a cylindrical nut 12 is threaded on the threaded part 9b of the sliding hollow member 9. The cylindrical rear portion of the hollow part 11 is provided with a plurality of radial slots 11' thereby affording it some elasticity. On this cylindrical portion is fitted a slotted ring 13 which can be tightened by means of a bolt 14. The tightening of this ring 13 causes a slight contraction of the rear portion of the hollow part 11 so that the three members 11, 12 and 13 are rigidly secured together to form a combined nut member with two integral threads of different pitches.

The ring 13 also has a radial portion 13' provided with a radial slot 13" in which is engaged a lateral pin 15 fixed to one end of a rocker 16 pivoted at 17 on a supporting arm 18 fixed to the tool holder support 2 by means of a bolt 19. The rocker 16 is actuated by a sliding rod 23 which is under the control of an electromagnet 24, in the circuit of which is connected a switch 25 mounted on the support 2 in the vicinity of slide 35 holding the severing or cutting-off tool 35a, which is the last of the tools coming into operation at the end of the cycle of operations for severing the workpiece from the stock bar, the latter being adapted at this moment to be advanced to some extent for the shaping of the next workpiece. As soon as the tool holder 35 reaches the end of its machining stroke, where is has been brought under the control of a cam on camshaft 3 by means of a rocker 40 carrying a micrometric adjusting screw 40a and a set screw 40b for locking screw 40a, an adjustable actuating screw 41 screwed into a supporting arm 42 and locked by a set screw 41a actuates switch 25. Therefore arm 42 is fixed on the upper face of slide 35. Upon actuation, switch 25 closes the circuit of the electromagnet 24, thus causing the rocker 16 to rock against the action of the return spring 22. This rocking movement is transmitted to the ring 13 so as to rotate the combined nut members 11, 12, 13 on the two threads on the parts 8', 9b. Since the sleeve 8 is fixed as above mentioned while the hollow member 9 can slide longitudinally within the sleeve 8 and since, as above mentioned, the threads on the sleeve and on the hollow member are of different pitches the hollow member 9 is displaced rearwardly by an amount which is just sufficient to allow the guide collet 9' to open slightly. From this moment on the stock bar can move freely forward in the guide collet.

When the tool 35a is retracted, screw 41 leaves the contact 25, the electromagnet 24 is released and the return spring 22 rocks the rocker 16 in the opposite direction. The combined nut member is thus rotated in the opposite direction and the hollow member 9 now makes a forward movement to restore the guide collet 9' to its guiding position. It will thus be seen that by longitudinal reciprocating movement of the hollow member 9 within the sleeve 8 due to rotation in one direction and the other of the combined nut members 11, 12, 13 itself operated from tool holder 35, the guide collet is caused to open and to close again at each actuation of the tool 35a, i.e. at each cycle of operations.

As may be seen in FIG. 1 the rocker 16 is provided with a stop screw 16' cooperating with a lug 18' integral with the support 18 and enabling the rocking of the rocker 16 when the electromagnet 24 is released to be limited in a regulatable manner. It will also be seen that by loosening the bolt 14, the nut members 11, 12, 13 can be adjusted on the threaded part of the sleeve 8 thereby to adjust very precisely the guiding clearance to be given to the stock bar in the guide collet 9'.

The result of the foregoing is that the control of the combined nut members 11, 12 and 13 causing the opening and closing of the head of the guiding and centering collet is, as a matter of fact, performed from the camshaft 3, however by means of one of the tool holders which, at the end of its machining stroke, initiates the operation of electromagnetic power means (which could, however, be replaced by equivalent means of pneumatic or hydraulic type or of combined type), the power means actuating the rocker connected to the rotary combined nut members 11, 12, 13.

The control device described above constitutes a substantial improvement of the device disclosed in the U.S. Patent No. 3,115,800. Since the power necessitated by the actuation of the stock guiding device is now derived from an electromagnet and not from the camshaft, the latter is not loaded with the device disclosed above as much as with the device in the U.S. Patent No. 3,115,800. There is also no danger of jeopardizing the precision of the work of the tool which is connected to the member initiating the power means which actuate the stock guiding collet. Moreover, no additional cam must be provided in connection with the control device according to the invention.

I claim:

1. In an automatic lathe having a sliding headstock and cam controlled tools, each being associated with lathe members forming a unit moving together with the corresponding tool on a lathe support, a control device and a stock guiding collet comprising a sleeve adapted to be fixed to said support, a hollow member slidable in said sleeve, a guide collet at the forward end of said hollow member for guiding the work bar, cooperating formations in said sleeve and on said collet whereby the collet can be closed into guiding position and opened by longitudinal movement of said hollow member in relation to said sleeve, a rotatable operating member coupled to the rear ends of said sleeve and said hollow member for effecting the longitudinal movement of said hollow member in relation to said sleeve, a motor operated device for actuating said rotatable operating member, a mechanically actuated initiating device controlling said motor operated device, said initiating device being located to be actuated by one of the lathe members at the end of its operation in the cycle of machining operation, thereby to cause said collet to be opened and to be closed again when the lathe member is returned by the action of said cam shaft, and stop means limiting the closing action of said guide collet.

2. A control device according to claim 1 in which said control device is located to be actuated by the toolholder which acts last in the cycle of machining operations.

3. A control device according to claim 1 in which said motor operated device includes a power device which when energised causes said collet to be opened and a return spring which causes sail collet to be closed when said power device is de-energised.

4. A control device according to claim 1 in which said motor operated device includes an electromagnet which when energised causes said rotatable operating member to be moved in such direction as to open said collet, in which said initiating device is an electric switch in the circuit of said electromagnet, and in which a return spring serves to close said collet when said electromagnet is de-energised.

References Cited by the Examiner

UNITED STATES PATENTS

| 2,333,180 | 11/43 | Holmes. |
| 2,871,022 | 1/59 | Farnsworth _____ 279—52 X |
| 3,010,348 | 11/61 | Swanson et al. _____ 82—2.5 |
| 3,115,800 | 12/63 | Megel et al. _____ 82—38 |

FOREIGN PATENTS

| 813,046 | 5/59 | Great Britain. |

WILLIAM W. DYER, Jr., *Primary Examiner.*